(12) United States Patent
Asahara et al.

(10) Patent No.: US 8,005,612 B2
(45) Date of Patent: Aug. 23, 2011

(54) MAP DATA DISTRIBUTION SYSTEM

(75) Inventors: Akinori Asahara, Kokubunji (JP); Kenji Naka, Tokyo (JP); Michio Morioka, Hitachi (JP); Hirokazu Inayoshi, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1060 days.

(21) Appl. No.: 11/878,899

(22) Filed: Jul. 27, 2007

(65) Prior Publication Data

US 2008/0086262 A1 Apr. 10, 2008

(30) Foreign Application Priority Data

Oct. 5, 2006 (JP) ................................ 2006-273570

(51) Int. Cl.
*G01C 21/30* (2006.01)

(52) U.S. Cl. ........ 701/208; 701/200; 701/217; 701/221; 701/224; 707/999.002; 707/999.003; 707/999.1; 707/999.202; 707/999.204; 340/988; 340/990; 340/995.18; 340/995.25; 345/502; 345/545; 345/564; 342/64; 717/113

(58) Field of Classification Search ................. 701/200, 701/208, 217, 221, 224; 707/999.002, 999.003, 707/999.1, 999.202, 999.204, 999.101, 999.103, 707/999.102; 340/988, 990, 995.18, 995.25; 345/502, 545, 564; 342/64; 717/113; 33/356; 1/1; 715/708

See application file for complete search history.

(56) References Cited

U.S. PATENT DOCUMENTS 7,685,385 B1 *  3/2010  Choudhary et al. .......... 711/162
2002/0091485 A1 *  7/2002  Mikuriya et al. ............. 701/208
2002/0091702 A1 *  7/2002  Mullins ......................... 707/100
2002/0194181 A1 * 12/2002  Wachtel ......................... 707/10
2004/0117110 A1 *  6/2004  Sasajima ....................... 701/208
2006/0026170 A1 *  2/2006  Kreitler et al. .................. 707/10

(Continued)

FOREIGN PATENT DOCUMENTS

EP  1 657 526 A2  5/2006

(Continued)

OTHER PUBLICATIONS

Extended European Search Report Communication issued Feb. 24, 2011 by the European Patent Office in Application No. 07014715.2—1236/1909068 (8 pages).

*Primary Examiner* — James P Trammell
*Assistant Examiner* — McDieunel Marc
(74) *Attorney, Agent, or Firm* — Stites & Harbison PLLC; Juan Carlos A. Marquez, Esq.

(57) ABSTRACT

A map distribution system includes a map distribution server that distributes map data to a navigation device. The server includes a first table having entries that each include update data in correspondence with an ID for the update data and an ID for each other update data upon which the update data depends, a second table having entries that each include an area ID of an area of the map data in correspondence with a version of the area and the ID for each update data that is applied in the version of the area, and an update manager that refers to the second table to select the ID for each update data required for updating an area selected based on input from the navigation device and the required ID for each other update data upon which any update data required for updating the area selected depends.

18 Claims, 21 Drawing Sheets

U.S. PATENT DOCUMENTS

| | | |
|---|---|---|
| 2006/0095202 A1 | 5/2006 | Atarashi et al. |
| 2006/0167934 A1* | 7/2006 | Nomura ..................... 707/104.1 |
| 2006/0220923 A1* | 10/2006 | Tanizaki et al. ............ 340/995.1 |
| 2007/0032949 A1 | 2/2007 | Arai et al. |
| 2007/0229490 A1* | 10/2007 | Boudreau et al. ............. 345/418 |
| 2009/0019095 A1* | 1/2009 | Asahara et al. ............... 707/203 |
| 2009/0171976 A1* | 7/2009 | Obara et al. .................... 707/10 |
| 2009/0228212 A1* | 9/2009 | Smartt et al. ...................... 702/5 |

FOREIGN PATENT DOCUMENTS

| | | |
|---|---|---|
| JP | 2002-279437 | 3/2001 |
| JP | 2002-279437 | 9/2002 |
| JP | 2005-122003 | 10/2003 |
| JP | 2004-191115 | 7/2004 |
| JP | 2005-241373 | 9/2005 |

* cited by examiner

FIG. 3
LINKE-DATA TABLE

| LINK ID (301) | AREA ID (302) | WIDTH (303) | LINK-TYPE FLAG (304) | POINTS DATA (305) | START NODE (306) | END NODE (307) |
|---|---|---|---|---|---|---|
| 0001 | 1 | 10 | 10 | {x'1,y'1,...} | 1001 | 1007 |
| 0002 | 2 | 10 | 10 | {x'1,y'1,...} | 1002 | 1008 |
| 0003 | 3 | 5 | 5 | {x'1,y'1,...} | 1003 | 1009 |
| 0004 | 4 | 5 | 5 | {x'1,y'1,...} | 1004 | 1010 |
| ⋮ | ⋮ | ⋮ | ⋮ | ⋮ | ⋮ | ⋮ |

FIG. 4
NODE DATA

| NODE ID (401) | AREA ID (402) | POSITION IN COORDINATE SYSTEM (403) | CONNECTED LINK ID (404) |
|---|---|---|---|
| 0001 | 1 | (x,y) | 1001 |
| 0002 | 2 | (x,y) | 1002 |
| 0003 | 3 | (x,y) | 1003 |
| 0004 | 4 | (x,y) | 1004 |
| ⋮ | ⋮ | ⋮ | ⋮ |

FIG. 6
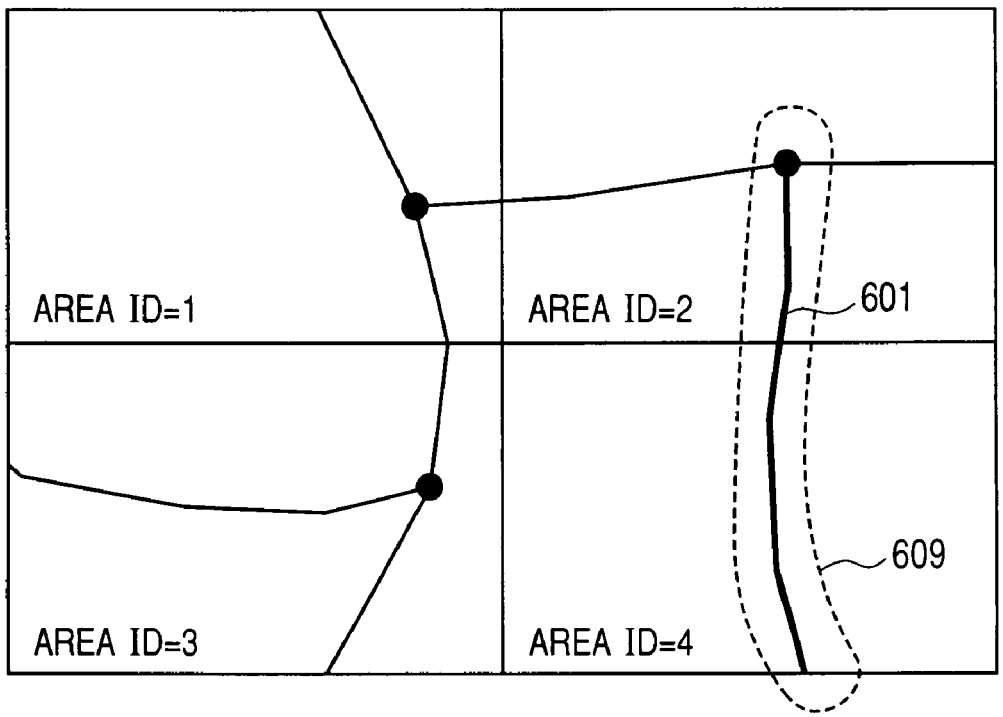
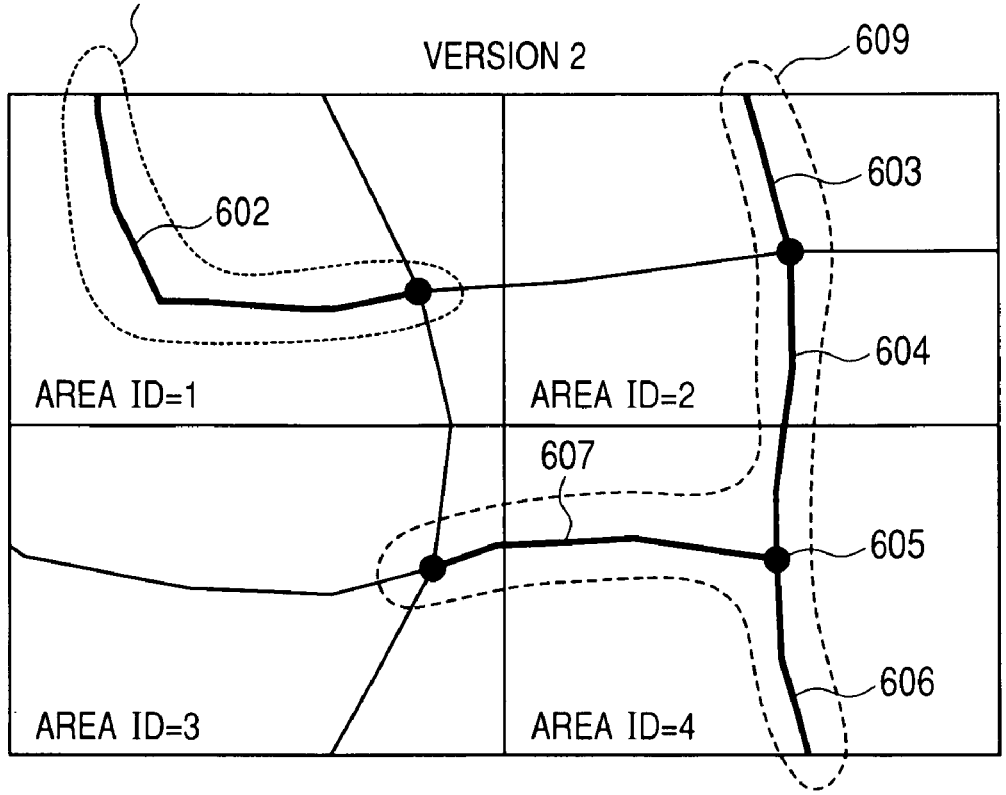

A MAP DATA IN CASE THAT ONLY AREA ID=4 WAS UPDATED

FIG. 12
MAP-UPDATE DATA MANGEMENT TABLE

| MAP-UPDATE DATA ID | VERSION | DEPENDENCY MAP-UPDATING DATA ID | PATH TO MAP-UPDATE DATA |
|---|---|---|---|
| 1 | 1 | | ID_000001.dat |
| 2 | 1 | | ID_000002.dat |
| 3 | 1 | | ID_000003.dat |
| ... | ... | ... | ... |
| 144 | 2 | 2,3 | ID_000144.dat |
| 145 | 2 | 3 | ID_000145.dat |
| ... | ... | ... | ... |

FIG. 13
LINK LAST UPDATE TABLE

| LINK ID | LAST MAP-UPDATE DATA ID |
|---|---|
| 00001 | 1 |
| 00002 | 4 |
| ... | ... |

FIG. 14

MAP-UPDATE DATA PER AREA MANAGEMENT TABLE

| AREA ID (1401) | VERSION (1402) | LIST OF NECESSARY MAP-UPDATE DATA (1403) |
|---|---|---|
| 0001 | 001 | 1, 2, 4, 5 |
| 0002 | 001 | 4, 5, 15, 32 |
| 0001 | 002 | 1, 2, 4, 5, 32, 43, 54 |
| 0002 | 002 | 4, 5, 15, 32, 43, 44, 45, 46 |
| ... | ... | ... |

FIG. 16
VERSION 1
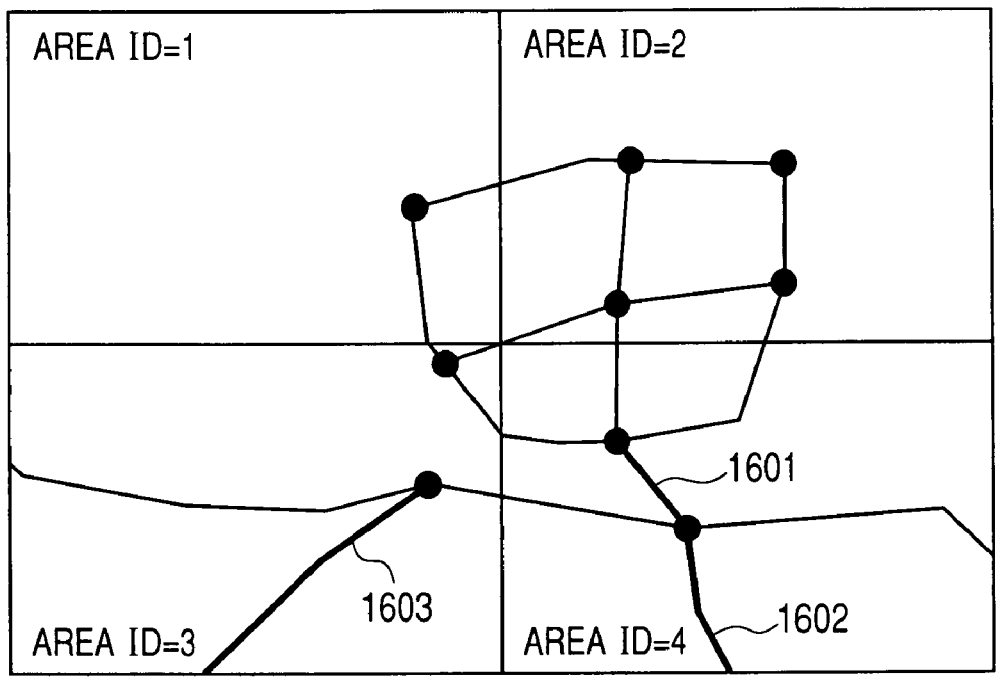
VERSION 2
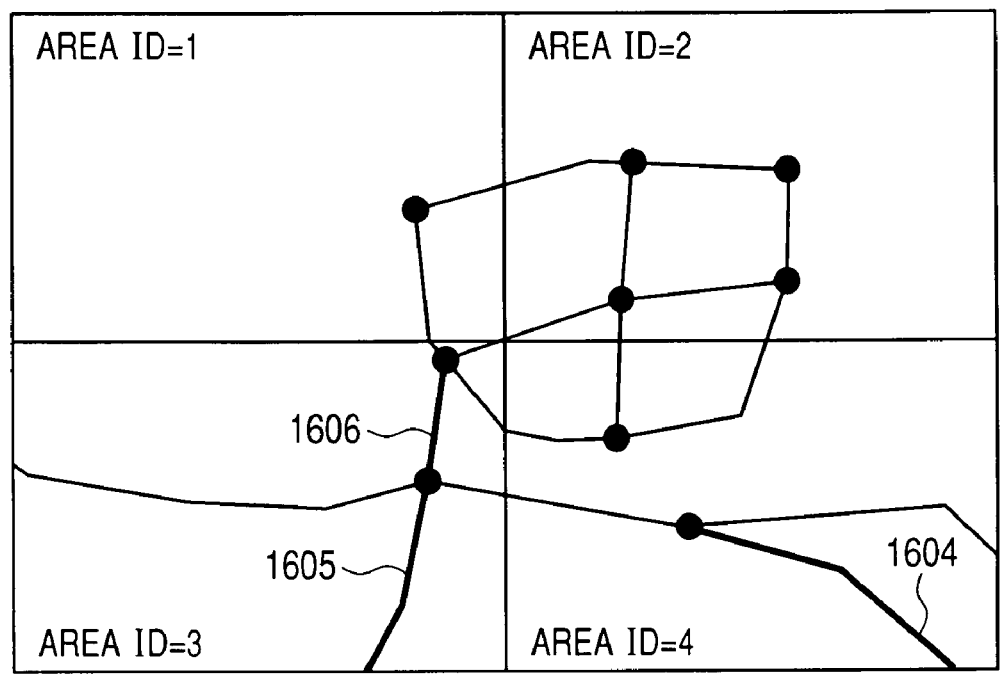

A VERSION 2 DATA DATA IN CASE THAT ONLY AREA ID=4

TEMPORARY DATA OF WHICH MODIFIED LINKS ARE REMOVED

FIG. 19

MAP-UPDATE REQUEST 806

```
MAP-UPDATE REQUEST
├─ AREA TO UPDATE
│   └─ AREA IDs
└─ VERSION INFORMATION
    ├─ BASE VERSION
    └─ UPDATED AREA'S VERSION
        └─ AREA IDs: VERSION
```

MAP DATA DISTRIBUTION SYSTEM

CLAIM OF PRIORITY

The present application claims priority from Japanese application JP 2006-273570 filed on Oct. 5, 2006, the content of which is hereby incorporated by reference into this application.

FIELD OF THE INVENTION

The present invention relates to a data updating method for a map data distribution system.

BACKGROUND OF THE INVENTION

The map data update systems disclosed in JP-A No. 2002-279437 and JP-A No. 2005-122003 have been known as an apparatus to update map data in units of several areas. The apparatus of JP-A No. 2002-279437 is characterized by that, when updating map data in units of sever al areas, the connection between roads is maintained by sending simultaneously only the connection information to resolve any disconnection across areas. The apparatus of JP-A No. 2005-122003 is characterized by that it is determined in advance whether or not a disconnection of roads is detected at the border between areas and this information is obtained before the start of updating.

SUMMARY OF THE INVENTION

According to JP-A No. 2002-279437, it is possible to maintain the connection to a road located at the boarder with an adjacent area even when the road becomes disconnected at the update area boarder. However, in case of a newly opened road or a road running across plural areas, there may not be a connectable road in the adjacent area. Therefore, the connection across the boarder always can never be guaranteed. Also, this apparatus cannot prevent a road network from being disconnected. According to JP-A No. 2005-122003, it is possible to take such measures as stopping the update when a disconnection occurs at the boarder of an update area. However, this apparatus has a problem that adjacent areas are also updated if the map update continues and therefore the update spreads to the adjacent areas, which increases the amount of communication data.

To overcome these problems, it is necessary to provide a function of updating only the limited area in the map while maintaining the connection between roads. A conceivable method is updating the map in the units in which roads are always correctly connected, but this method has some problems. The present invention is to solve the following two problems out of the above problems.

The first problem is nonexistence of path on the road network between two roads. For example, in case that a sole road to access to isolated roads is deleted and another accessible road is added, there will be no road accessible to the isolated roads after only the deletion is applied. Consequently, if the destination of path searching is set to the isolated roads, it will return a result that there is no path to the destination after a long time processing.

The second problem is version management of map data. When a part of a road map is updated, the map will include both of old part and new part in the road network. Therefore, it is necessary to have a method to determine which update has not been applied yet. One of the known methods for this purpose is management by square pieces of map data which are called mesh. By the method, the update time of each mesh is recorded, and sent as version. However, since the update unit for maintaining the connection of roads is not a mesh, this method does not serve the purpose. On the other hand, there is another method of assigning an identification number to each update unit of roads, but the amount of communication data is increased because all numbers of applied update unit must be sent. To solve this problem, the present invention provides a method of reducing the amount of communication data between a map distribution server and a terminal even if the map data is updated in the unit to maintain the connection of roads.

The above problems can be solved by a system according to the present invention which is composed of a server to distribute map data and a navigation device to receive the map data, and the server includes: a map update data memory that holds the map update data with which the server updates map data, and corresponding map update data IDs; a map update data manager that holds a specific area of map data, the version of that area, and the corresponding ID of map update data that must have been applied; a map update data manager capable of selecting the map update data ID required to update a specific area using the above map update data manager; and a map update data distributor capable of sending back map update data on receipt of a map update data ID.

Also, it is possible to prevent disconnection of a updated road network by providing: a function of dividing a network from which the map data to update is removed by the map update manager of the map distribution server into connected components; a function of detecting map update data that disconnects or connects a road between the connected components; a function of rewriting the map update management data memory so that, whenever the map update data to disconnect between connected components is applied, plural or single map update data to connect between connected components is distributed.

The server mentioned above is a device that is always connected to a network and that receives a data distribution request from other devices connected to the network and sends back a reply. The navigation device is a device that uses the map held in the map data memory to perform navigation functions such as map display, route search, and route guidance. The connection used above means that, when a road network is considered as a graph, there exists a path between arbitrary two points on the road network, and the connected components refer to respective network elements into which a discontinuous road network is divided in units of connected parts.

Also, it is possible to prevent disconnection of a updated road network by providing: a function of dividing a network from which the map data to update is removed by the map update manager of the map distribution server into connected components; a function of detecting map update data that disconnects or connects a road between the connected components; a function of rewriting the map update management data memory so that, whenever the map update data to disconnect the road between connected components is applied, plural or single map update data that disconnect the road between connected components is distributed.

According to the present invention, it is possible to reduce the size of communication data required to update a map while guaranteeing the connection of a road network when updating only a part of an area on the map.

BRIEF DESCRIPTION OF THE DRAWINGS

FIG. 3 is an exemplary link data table to store road data for the map distribution server and the navigation device;

FIG. 4 is an exemplary node data table to store intersection data for the map distribution server and the navigation device;

FIG. 6 shows a comparison between two versions of maps;

FIG. 12 is an exemplary map update data management table;

FIG. 13 is an exemplary link last update table;

FIG. 14 is an exemplary map update data per area management table;

FIG. 16 is an example of map data that can be unconnected when the map is updated in units of areas;

FIG. 19 is an exemplary data structure of a map update request to be sent from the navigation device to the map distribution server;

DETAILED DESCRIPTION OF THE PREFERRED EMBODIMENTS

Figure 1:
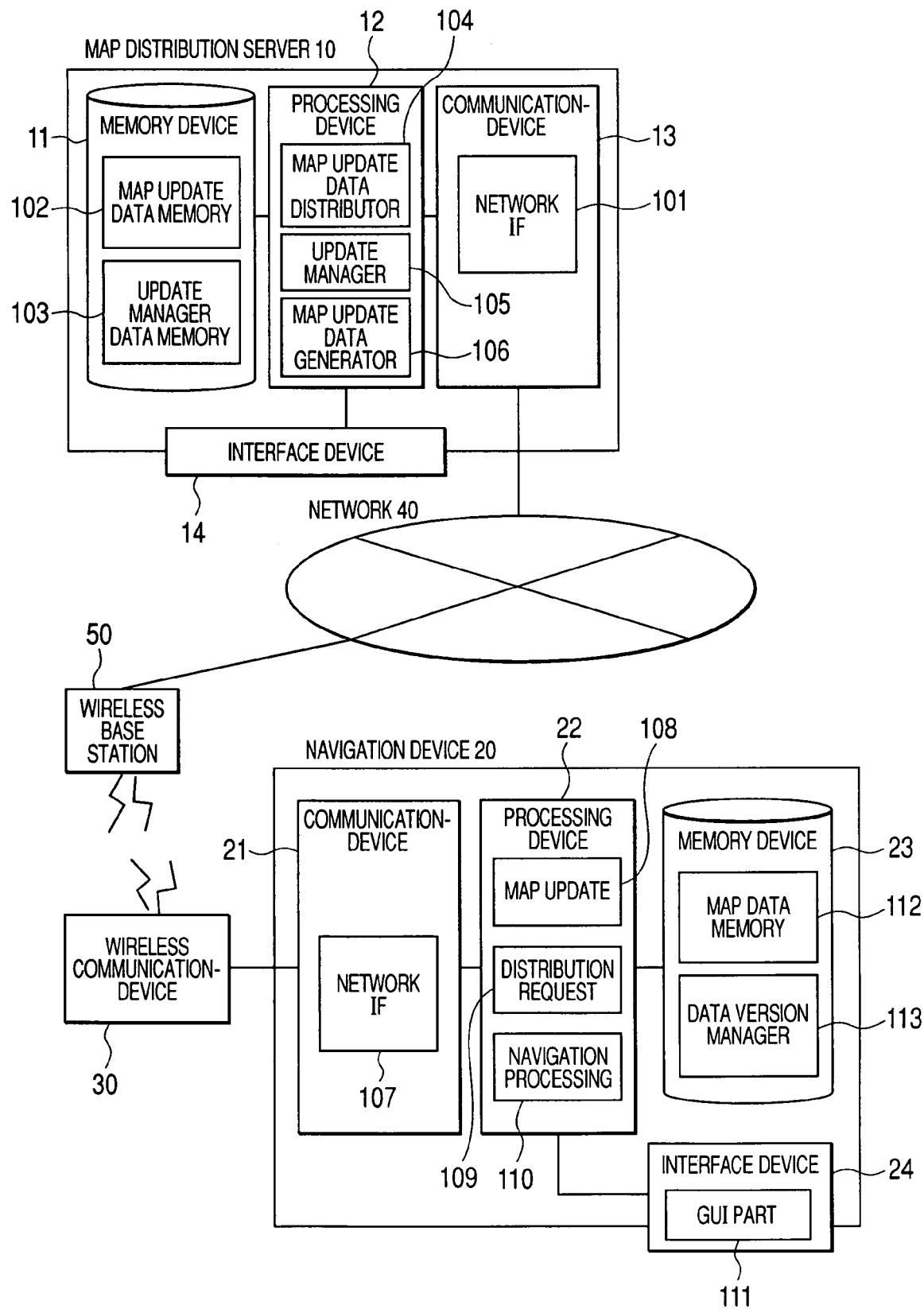
FIG. 1 is an exemplary configuration of a map data distribution system of the present invention.

FIG. 1 shows the schematic diagram of a map data distribution system of an embodiment according to the present invention. The map data distribution system of this embodiment includes a map distribution server 10 connected to a network 40 and a navigation device 20. A wireless communication device 30 is connected to the navigation device 20. The navigation device 20 is capable of connecting itself to the network 40 via a wireless base station 50 by means of the wireless communication device 30. This enables the navigation device 20 to request map update data from the map distribution server 10. The wireless communication device 30 may be built into the navigation device 20.

The map distribution server 10 includes a memory device 11 to store map update data, a processing device 12 to perform various processing, a communication device 13 to communicate with the navigation device 20, and an interface device 14 to operate the map distribution server 10. The communication device 13 has a network IF 101 through which to communicate with the network 40. The memory device 11 is composed of a map update data memory 102 and an update management data memory 103. The processing device 12 has a map update data distributor 104, an update manager 105, and a map update data generator 106 in order to realize the functions required for distributing map update data.

The navigation device 20 includes a communication device 21 to connect to the network 40 via the wireless communication device 30 and the wireless base station 50, a processing device 22, a memory device 23, and an interface device 24 through which to display information for users and accept instructions from users. The communication device 21 has a network IF 107 to connect to the network 40 via the wireless communication device 30 and the wireless base station 50. The processing device 22 includes a map update unit 106 and a distribution request unit 109, which are required to update map data, and also a navigation processor 110 to realize a navigation function. The memory device 23 is composed of a map data memory 112 to store maps to be displayed and a data version manager 113 to manage the version of map data. The interface device 24 has a GUI (Graphical User Interface) part 111 to accept inputs from users and display maps.

Figure 2:
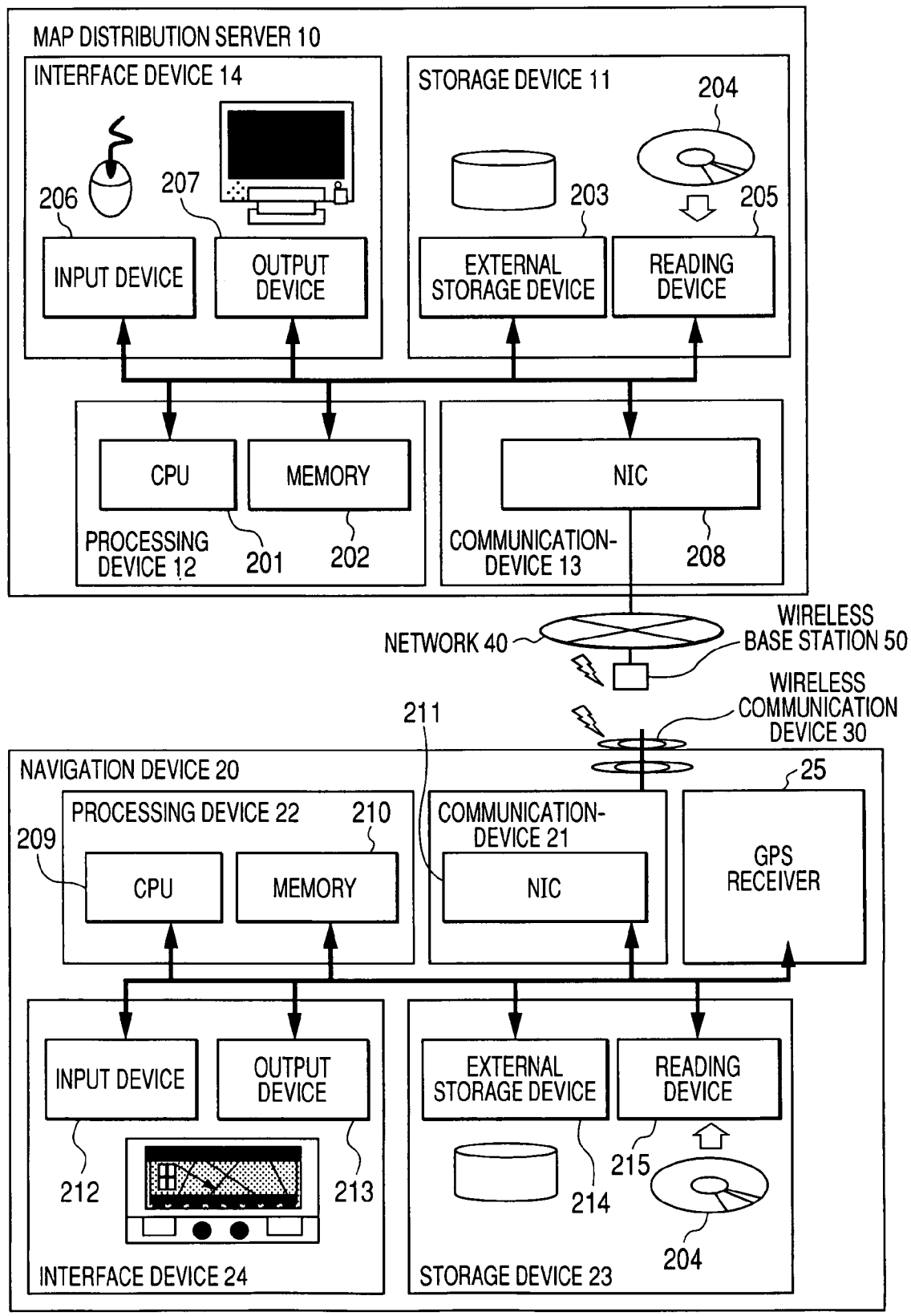
FIG. 2 is an example of device configuration of a map distribution server and a navigation device of the present invention.

FIG. 2 shows the configuration of a map data distribution system using a computer, as one embodiment of the present invention. The map distribution server 10 includes a CPU 201, a memory 202, an external storage device 203 such as an HDD, a reader 205 that reads information from a storage medium 204 such as a CD-ROM and a DVD-ROM, an input device 206 such as a keyboard and a mouse, an output device 207 such as a display, and an NIC (Network Interface Card) 208 to connect to a communication network. The external storage device 203 and the storage medium 204 can be used as the memory device 11, and the communication device 208 can be used as the communication device 13. Also, the processing device 12 can be realized by having the CPU 201 read a predetermined program onto the memory 202 and execute the same. This program may be available for execution such as by reading from the storage medium 204, by obtaining from a network via the communication device 208, or by reading from the external storage device 203 in which the program obtained from the network has been saved. Also, the map distribution server 10 may be composed of plural computers.

On the other hand, the navigation device 20 includes a CPU 209, a memory 210, a communication device 211 to connect to a network, an input device 212 such as a keyboard and a mouse, an output device 213 such as a display, an external storage device 215 such as an HDD, and a reader 215 to read information from a memory device 204 such as a CD-ROM and a DVD-ROM, as shown in the navigation device 20 of FIG. 2. The navigation device 20 also has a current position measurement device 25 including a GPS receiver, an orientation sensor, a velocity sensor, and the like. An external storage device 214 and a storage medium 20 can be used as the memory device 23, an NIC 211 as the communication device 23, and an input device 212 and an output device 213 as the input and output device 24. The processing device 22 can be realized by having the CPU 209 read a predetermined program onto the memory 210 and execute the same. This predetermined program may be available for execution such as by reading the program from the memory device 204 through the reader 205, or by obtaining the program from a network via the communication device 211, saving in the external storage device 214, and reading from the same.

The navigation device 20 is a device that performs such navigation functions as map display, route search, and route guidance, using map data stored in the map data memory 112. The road data contained in this map data has a network data structure composed of a link indicating a road between intersections and a node indicating an intersection, each link and node having an ID number. The map area covered by this map data is divided into, for example, rectangular areas each having an ID number, and therefore it is possible to update the map data in area units. Hereinafter, each of these divided map areas is referred to as an "area" and the ID of each area is called an area ID. This area is not restricted to rectangular and may be polygonal or circular. Also, it is possible to change the shape of the area even after the operation is started, by distributing area change information from the map distribution server 10. In this way, by dividing a map into areas of certain size, it is possible to update a map in the unit appropriate for specific uses, such as update only an area including, for example, the current position or update only an area including paths.

FIGS. 3 and 4 show exemplary recording formats of this map data. FIG. 3 is an exemplary recording format of a link data table. The "link" is data indicating a road between intersections as described above. Each record 300 of this table is composed of a field 301 to enter the link ID of a link, a field 302 to enter the area ID of an area to which the link belongs, a field 303 to enter the width of the link, a field 304 to enter the link-type flag that indicates the road type of a link such as ordinary road or toll road, a field 305 to enter the point data that is the coordinates of points (composed of a start node, an end node, and intermediate nodes located at turning points of a link), a field 306 to enter the node ID of the start node of the link, and a field 307 to enter the node ID of the end node of the link.

FIG. 4 shows a node data table to record nodes. A record 400 is composed of a field 401 to enter the node ID of a node, a field 402 to enter the area ID of an area where the node is located, a field 403 to enter the coordinates of the node, and a field 404 to enter the link ID of al link having the node as a start node or an end node. By checking if two road links have a common node ID with reference to these two tables, it is possible to determine whether or not the two roads are connected to each other. Hereinafter, if multiple road links have a common node ID, such road links are called "connected". By examining the connections of roads, it is possible to know which midway roads to take in order to travel from one road to another road, using a known path search technique.

The navigation device 20 has a function of updating to the latest data the link data within an area to be updated, out of the map data described above. Therefore, the navigation device 20 fetches data to update the map of the area to be updated from the map distribution server 10 via the network 40. This data is data that indicates differences between the past map and the latest map per feature on the map (link, guidance information, VICS information, information corresponding to wide-area map data, and the like), and includes processing instructions such as delete, add, reshape, and rename of features. Herein, this data is referred to as difference update data. The navigation device 20, when instructed by a user to update the map of a specified area via the GUI part 111, request from the map distribution server 101 difference update data required for updating the specified area. Hereinafter, this area to be updated is referred to as an "area to update". The navigation device 20 can update the map data for an area to update by rewriting the data in the map data memory 112 according to a processing instruction constituting the difference update data obtained from the map distribution server 10.

In order for the navigation device 20 to perform a useful navigation, roads connected with each other in the real world must be connected on the data even after a per-area update is done. Also, the same road must be registered again on the data. Alternatively, it is preferable that a road extending outside the area to update is naturally connected to at least a road outside the area to update. To meet these requirements, the map distribution server 10 distributes a set of difference update data so that roads are not disconnected. Herein, this set of difference update data that is collectively updated so that the network is not discontinued is referred to as "map update data".

Figure 5:
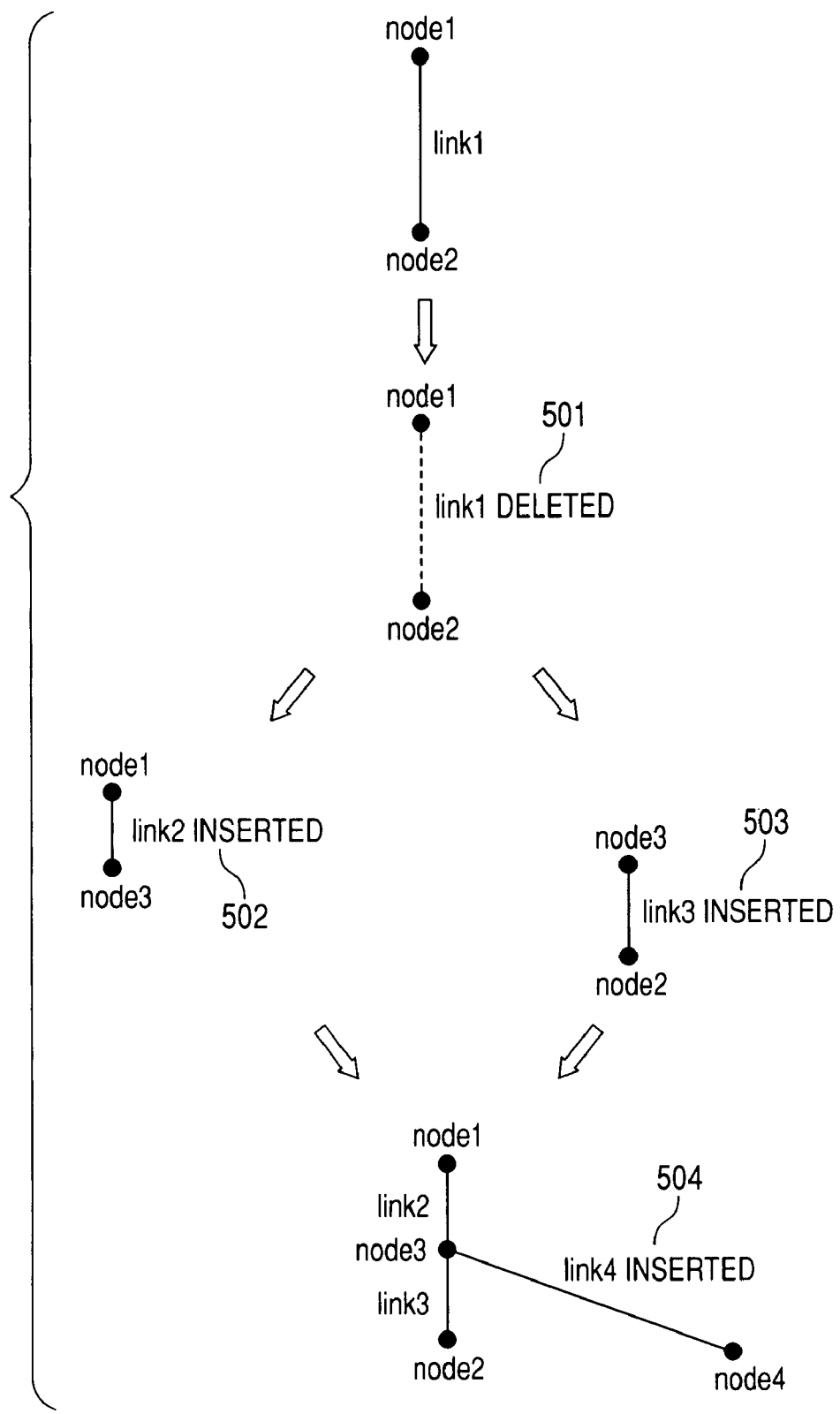
FIG. 5 shows a difference update data when the road data is divided.

FIG. 5 shows an example of map updating. This is an example of changing a straight road to a T-shaped intersection. Link 1 constituting a straight road is deleted (step 501), link 2 with one node designated as node 1 of link 1 and the other node as node 3 to be connected to a T-shaped intersection is added (step 502), link 3 with one node designated as node 2 of link 1 and the other node as node 3 to be connected to the T-shaped intersection is added (step 503), and finally link 4 with one node designated as node 3 is added (step 504). A set of difference update data representing a series of these addition and deletion becomes map update data.

Figure 7:
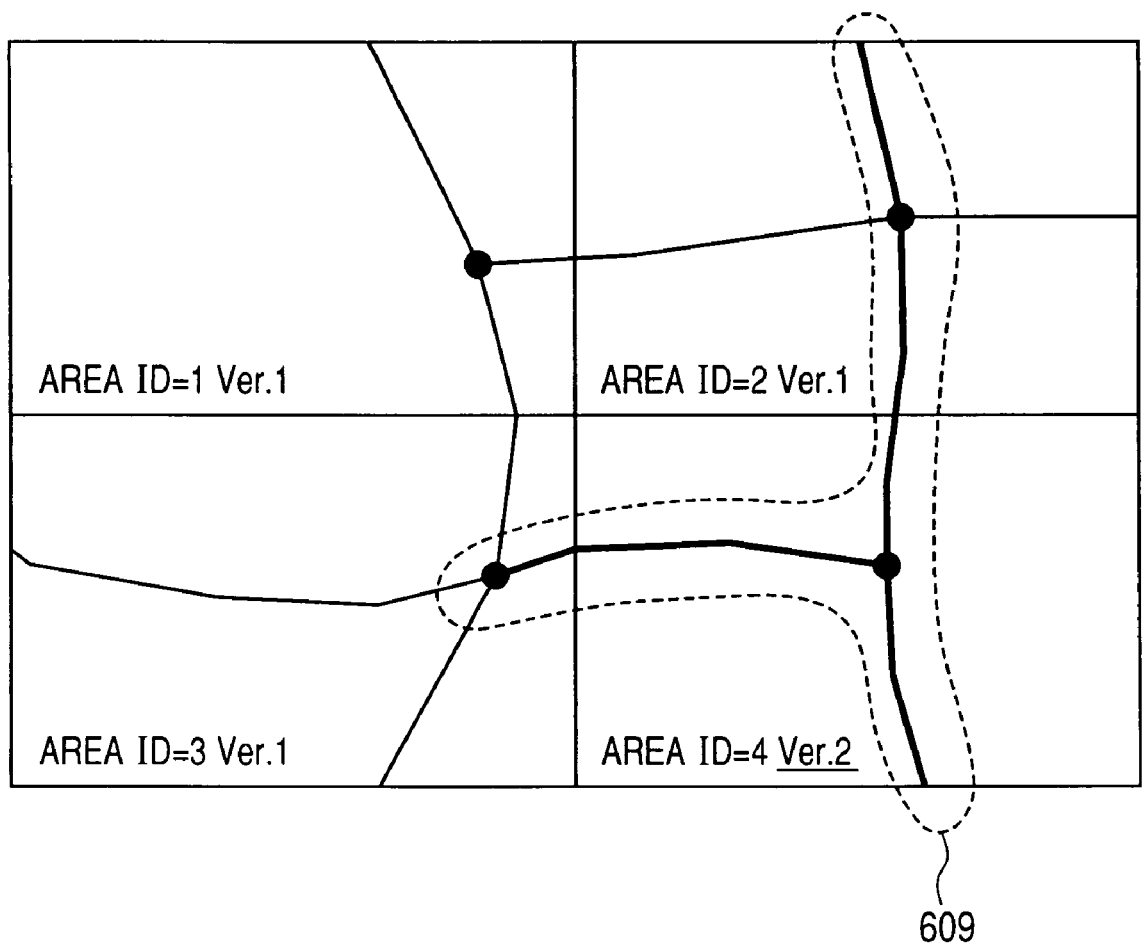
FIG. 7 shows an update of the map data for only a partial area.

Now, examples of per-area update by a map update distribution system of the present invention are shown with reference to FIGS. 6 and 7. This system releases new map data periodically and each map data is assumed to meet the following two requirements. The first requirement is that the link IDs of roads and the node IDs of intersections that have not been really changed be the same among different releases. This allows differences in map data to be identified correctly. The second requirement is that a network of roads be connected in any map data. If this requirement is met, when a path search is done within one map data, at least one path exists. A serial number assigned to this periodically released map data is called a version number. Hereinafter, the larger the version number is, the later the release is.

FIG. 6 shows examples of version 1 and version 2 map data, each composed of four areas. By comparing these two maps, deletion of link 601 from the version 1 map and addition of links 602, 603, 604, 606, 607 and node 605 are recognized as differences between version 1 and version 2. Out of these difference update data, added, deleted, or changed links that are interconnected to form a network are collected and designated as map update data. In these examples, a first map update data 608 is composed only of addition of link 602. A second map update data 609 is composed of deletion of link 601 and addition of links 603, 604, 606, 607, and node 605. To update the map data for an area to update, it is sufficient to apply map data at least part of which is included in the area to update.

FIG. 7 shows a case where only the area of area ID 4 has been updated when the map data of the navigation device 20 is version. In this example, the first map update data 608 is not applied because the area is not for area ID 4, and only the second map update data 609 is applied.

Figure 8:
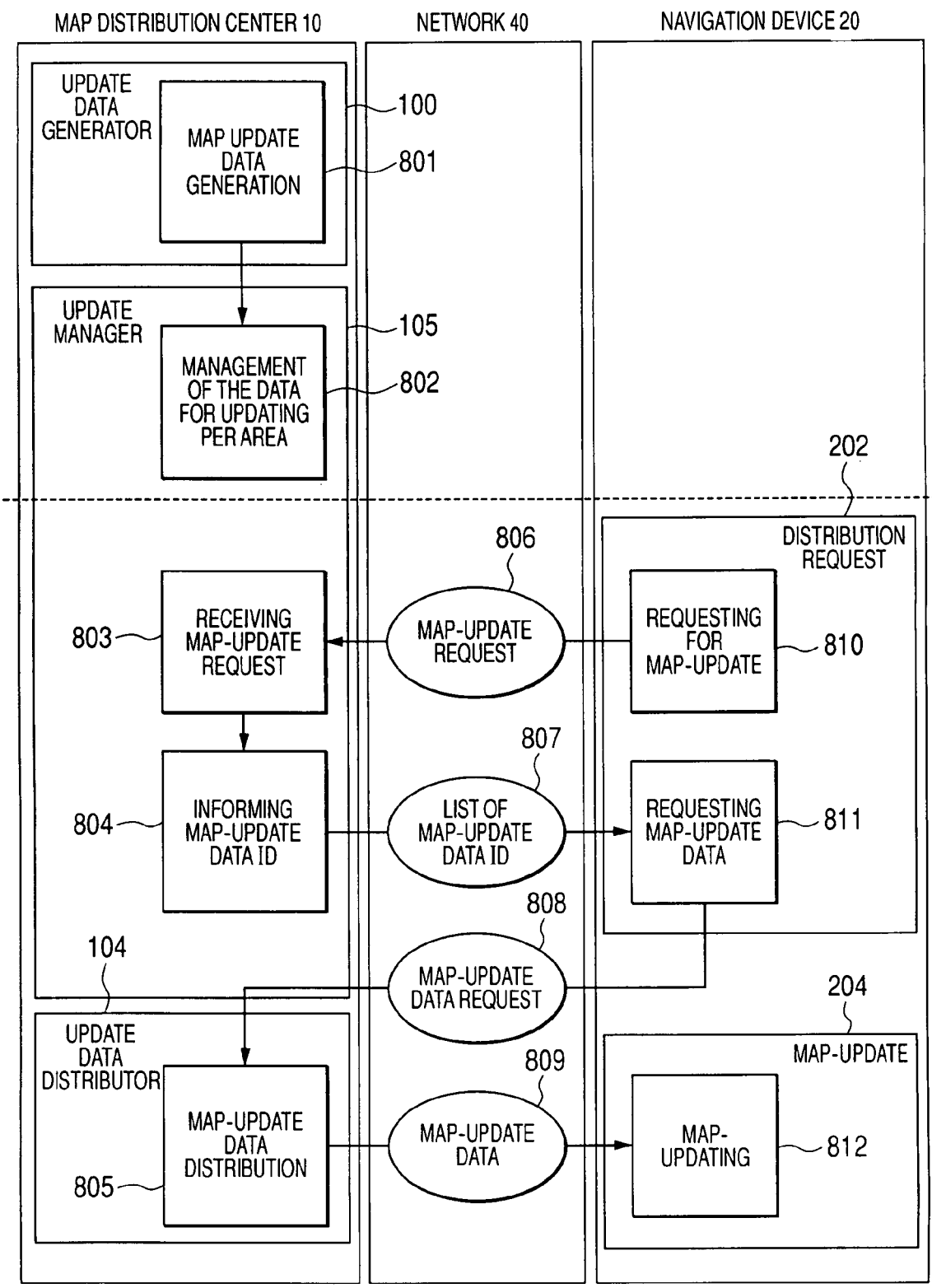
FIG. 8 is an exemplary update processing procedure of an embodiment.

FIG. 8 shows a map data update flow in a map data distribution system of the present invention. The map distribution center 10 performs a map update data generation 801 and a per-area update data management each time a new version of map is released, and stores the data required for update in the map update data memory and the update management data memory. Meanwhile, the navigation device 20 starts a map updating when a user operates the GUI part 111. First, the navigation device 20 sends a map update request 806 to the map distribution center 10 in a map update requesting 810. The map update request 806 contains a per-area version of map data. The map distribution center 10 obtains this per-area version information by the map update requesting 803. Next, the map distribution center 10 fetches a map update data ID required for updating the map data of this version by the map update request reception 803, and sends back a map update data ID list 807, which is a list of the map update data IDs, to the navigation device 20. The navigation device 20 select unobtained IDs from the received map update data ID list, and requests the unobtained map update data IDs by sending a map update data request 808 to the map distribution center 10. This processing is the map update data requesting 811. On receipt of the map update data request, the map distribution center 10 performs a map update data distribution 809 to send back map update data 809. On receipt of the map update data 809, the navigation device 20 performs a map updating 812 to update the map data.

Figure 9:
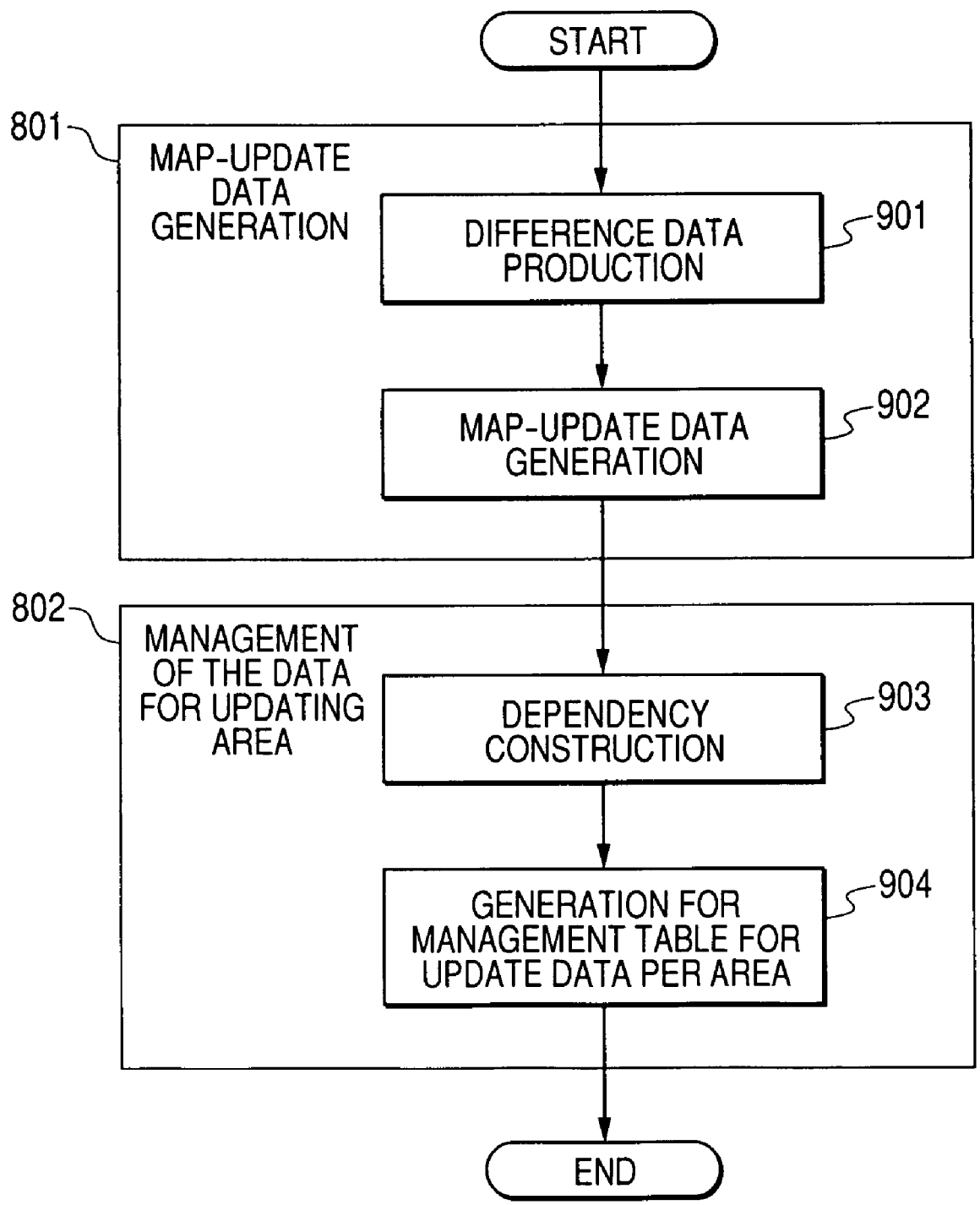
FIG. 9 is an exemplary processing to be performed by the map distribution server each time a new map is released.

Here, this map data update flow is described in detail. First, the flow of the map update data generation 801 and the per-area update data management 802 is shown in FIG. 9. When the map update data generation starts, a difference data production is performed to extract differences in map data. This processing compares the old and new versions of map data for the target area to produce differences. For example, if a link existing in the old version does not exist in the new version, an instruction to delete that link is produced as difference data. If a link not existing in the old version exists in the new version, an instruction to add that link is produce as difference data. If the same links existing in both versions have different shapes or types, an instruction to change to the link in the new version becomes difference data.

Next, the map update data generation 902 is performed. This processing is to classify the difference update data produced by a difference data production 900 in the units of map update data. For example, map update data is generated by selecting one piece of data from difference update data, following the road to be updated by the difference update data starting at a link to which an instruction or the like is to be executed, and collecting the difference update data for the links to which the network is connected. Then, a list of other map update data that must be applied before application of other map update data is produced. Thereafter, using this list, a per-area update data management table production 904 produces a list of map update data that must have been applied in order to update each area, and makes this list correspond to the version number of the latest version of the area at that time.

Figure 10:
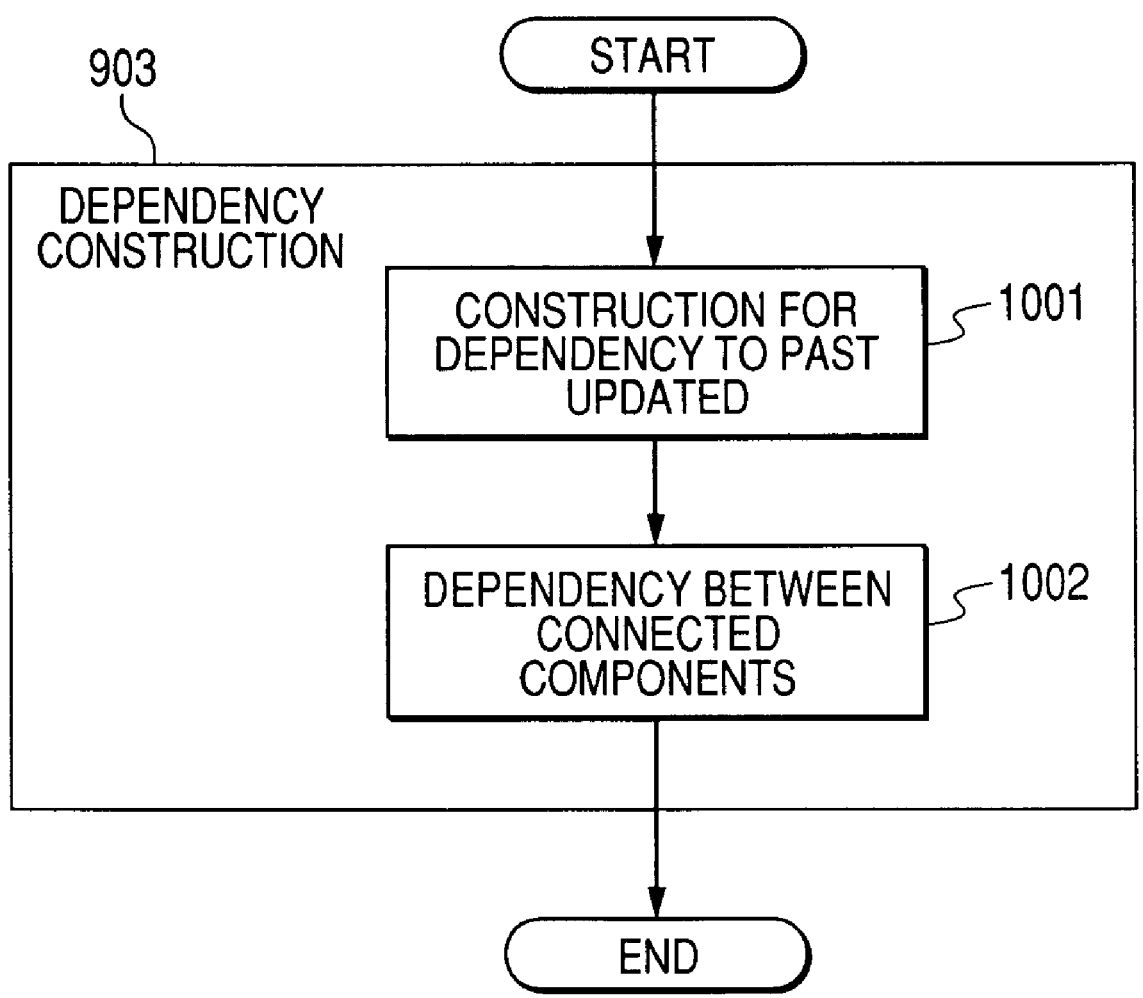
FIG. 10 is an example of dependency construction.

FIG. 10 shows an example of dependency construction 903. This dependency construction is a processing to produce a list of map update data that must have always been applied when applying each map update data. First, a past dependency construction 100 detects past map update data that must have been applied before any map update data is applied. Then, a construction of dependency between connected components 1002 is executed. This processing is to generate dependency between pieces of map update data to prevent the division of the network, when the network is divided into plural networks by a per-area update.

Figure 11:
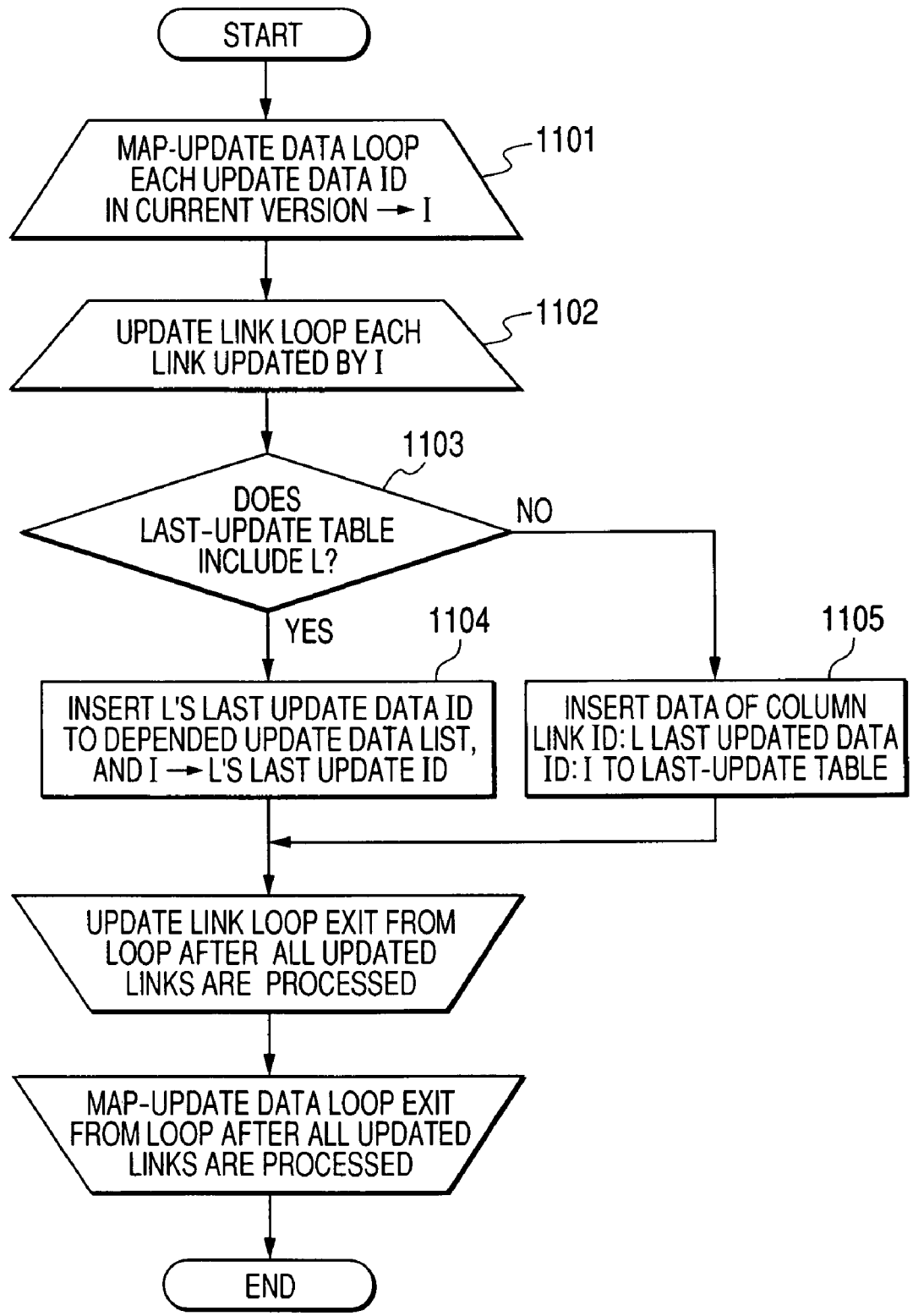
FIG. 11 is an example of past dependency construction.

FIG. 11 shows an example of the past dependency construction 1001. The past dependency refers to, for example, a case where, when changing a particular area of the map data of version 1 to version 3, part of the map update data to change the version 1 data to version 2 must have been applied. This processing produces a map update data management table, which is a table containing dependent map update data IDs.

An example of this table is shown in FIG. 12. This map update data management table is a table of corresponding items: map update data IDs 1201, versions 1202 of the map data in which the map update data was generated, a list 1203 of other map update data IDs on which the map update data depends, and the name of a file 1204 in which a set of difference update data is described. With the information of the map update data management table, it is possible to know that a map update data ID in the corresponding column 1203 need to be updated when updating a map update data ID in the column 1201. The map update data management table can contain the results of the past dependency construction 1001 and the construction of dependency between connect components 1002 described below.

The past dependency construction 1001 is a processing to select one piece of map update data generated in a new version of map data for an area and detect a map update data ID to which that map update data will depend. First, as shown at 1101, one piece of map update data is selected according to an appropriate order such as the order of IDs and that map update data is designated as I. Then, as shown at 1102, one link to update is selected appropriately by the map update data I. This link is designated as L. The ID of map update data in which the last update was made to this L is searched, and it is determined whether or not an applicable record exists. This link last update table makes each link ID 1301 and the map update data ID 1302 that last updated the link correspond to each other. If a record applicable to L already exists in this table (i.e., if that link has been made a link to update by the previous map update data), it means that there is a dependency between I and the map update data of 1302. Accordingly, as shown at 1105, this map update data ID is added to the map update data ID 1203 to which I's record of the map update data correspondence table, and the last map update data ID 1302 of a record applicable to L of the link last update table is designated as I. If L does not depend on the link last updated table, a record with link ID as L and last map update data as I is added, as shown at 1105. This processing is looped while assigning all the update links of map update data to L. The processing described above is performed to all the map update data while replacing I with each map update data.

A processing to produce a per-area map update data management table as shown in FIG. 14 using the dependency of each map update data after the dependency construction is the per-area update data generation 904 shown in FIG. 9. This table is a table to make the area ID correspond to the version 1402 and the required map update data ID list 1403, which is a list of the map update data that has been applied at that time. The per-area update data generation 904 generates a new version of record for each area to this table.

Here, this processing procedure is described with one area designated as X and a new version as n. First, a required map update data ID list 1403 corresponding to the version n−1 of the area X from the per-area map update data management table. A list Y is produced by combining the obtained list and the ID of the map update data, out of the map update data generated in version n, that affects the area X. Finally, a record is added to the per-area map update data management table, with the area ID 1401 designated as area X, the version 1402 as version n, the required map update data ID list 1403 as list Y. A new version of record can be added to the per-area map update data management table by performing this procedure to all areas.

Figure 15:
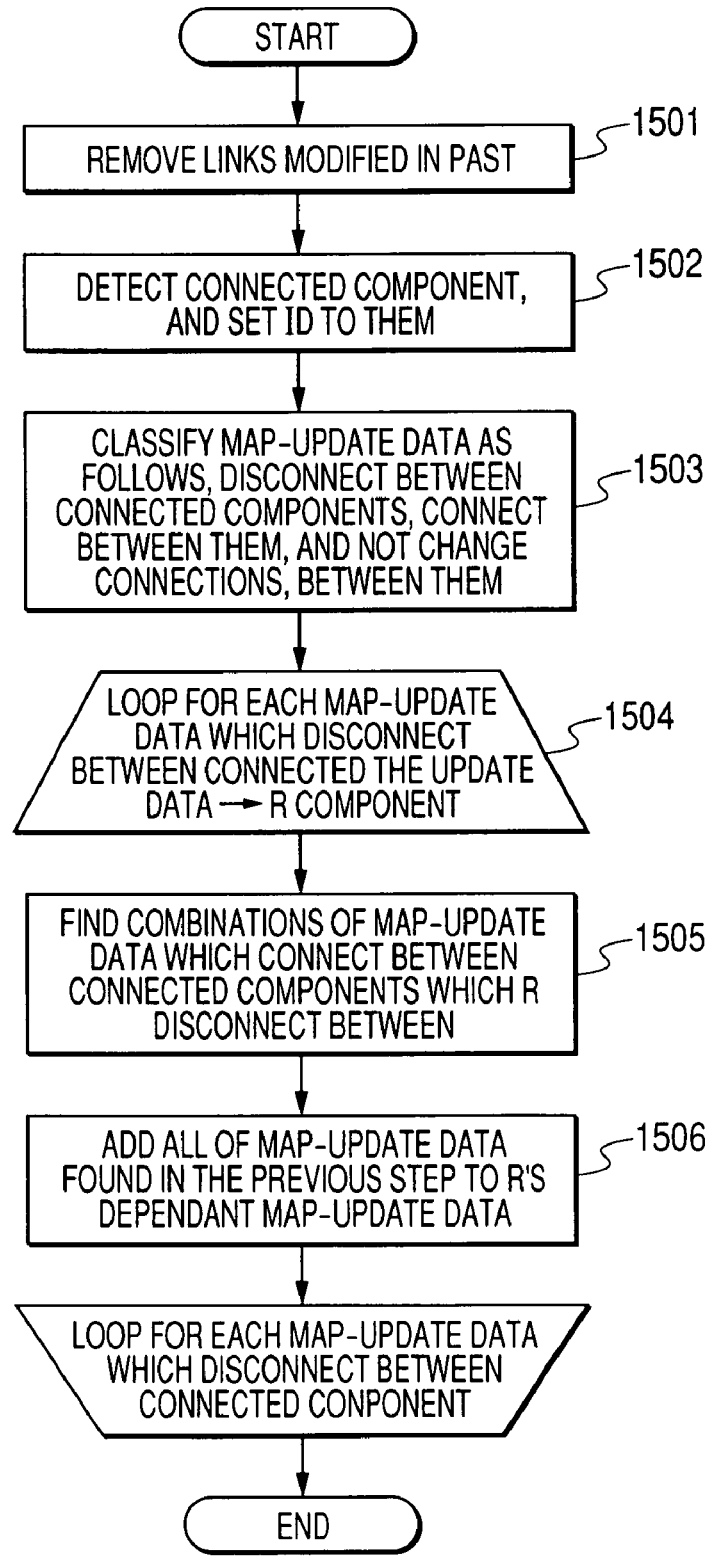
FIG. 15 is an exemplary procedure of dependency construction for connected components.

An example of the procedure of a construction of dependency between connected components 1002 is shown in FIG. 15. This is a processing to rewrite the dependency so that, when a map was updated in area units, map update data is applied in such a combination in which roads are always connected. FIG. 16 shows an example of this processing. This is an example where a road has been shifted when the version was changed from version 1 to version 2. The first map update data of this example is deletion of links 1601 and 1602 and the addition of a link 1603. The second map update data is deletion of a link 1603 and addition of links 1605 and 1606. At this time, if the navigation device 20 having version 1 data attempts to update only the area ID=4 to version 2, only the first map update data described above will be applied, thus resulting in disconnection of components.

Figure 17:
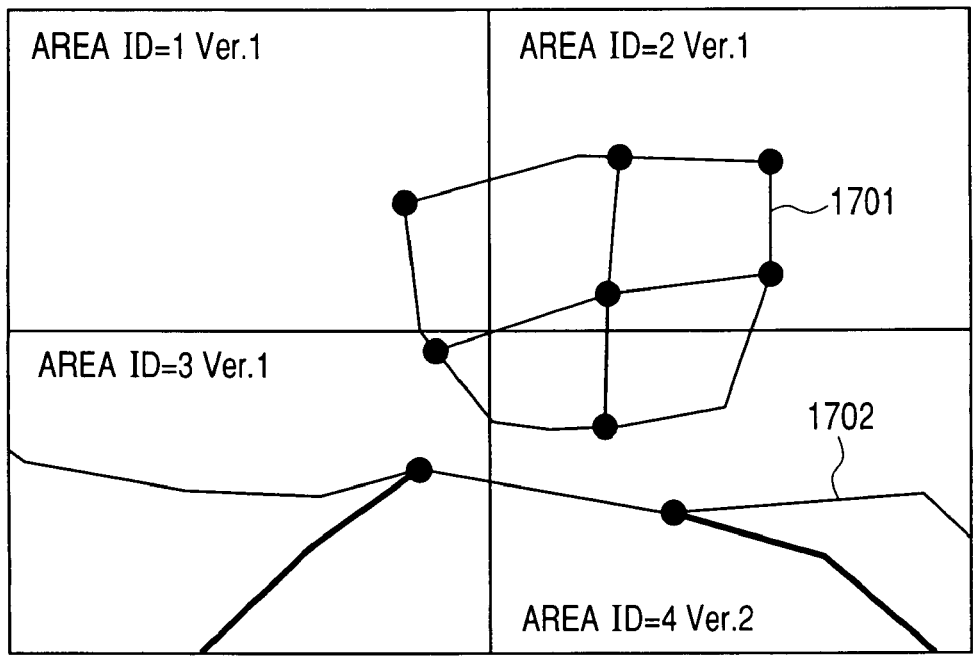
FIG. 17 is a case where roads are unconnected when the map data in FIG. 16 is updated in units of areas.

An example of this is shown in FIG. 17. In this example, the network 1701 and the network 1702 are not connected. Therefore, if a destination is set in the network 1701 when the current position is on the network 1702, no path exists and the path search will not end, disabling the guidance. According to the present invention, the second map update data is added to the dependent map update data of the first map updated data, and therefore there is provided a mechanism that allows all the road networks to be connected.

Figure 18:
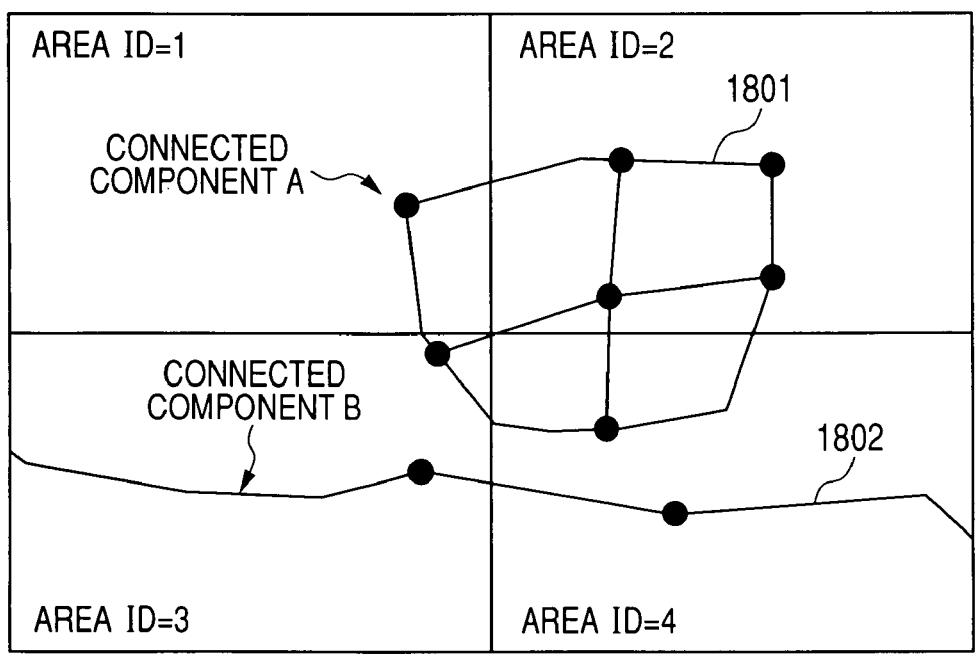
FIG. 18 is a diagram to illustrate how the connected components are detected by excluding the updated roads.

The procedure of the construction of dependency between connected components 1002 of FIG. 15 is described below. First, a link that was deleted or added by the past map updated data at 1501, and connected components are detected at 1502 and an ID is assigned to each connected component. An example of this is shown in FIG. 18. This example is a network from which a link updated between two versions of FIG. 16, and is divided into two connected components. As shown in the figure, connected component A and connected component B are assigned to these components respectively. By excluding not only deleted or added roads but also one-way roads and closed roads, this processing can also detect connected components that are not connected in effect.

Next, at step 1503, each map update data is classified from the viewpoint of effect on connection between connected components. This processing first detects which link connecting connected components is deleted by the link to delete in each update data, and then detects which connected components are connected in the link to add. By overlapping these two, it is possible to determine whether the map update data will disconnect, connect, or will not affect the connected components. In the example of the first map update data of FIG. 16, the link to delete disconnects the connected components A and B, and therefore a link to add only exists in A. Accordingly, this map update data will disconnect the connected components A and B. Also, making a similar determination for the second map update data in FIG. 16 can determine that this data is map update data that connects the connected components A and B.

At next step 1504, all the map update data that was determined to disconnect the connected components at step 1503 are looped with loop variable R, and the following processing is performed. First, at 1505, a combination of map update data connecting the connected components that is disconnected by R is searched. At this time, if more than one combination exist, several criteria are used, such as a combination to shorten the path between connected components, and a combination to minimize the distribution data. Next, at step 1506, the update data ID in the combination of map update data described above is added to the dependent map update data ID 1203 in the R's map update data management table. In the example of FIG. 16, the second map update data ID is added to the first map update data record. As a result, if the area with area ID=4 in FIG. 16 is attempted to update, for example, the second update data (deletion of 1603, addition of 1606 and 1605), which is the dependent map update data of the first update data, is always applied when applying the first update data affecting the area with area ID=4, and therefore the disconnected components as in FIG. 17 will not occur. On completion of these two steps 1505 and 1506, this processing is finished.

Although the example of FIG. 16 shows a case of two versions, it is possible to prevent network disconnection even when three or more versions exist, by performing the above processing for all the map update data updated between the versions. At this time, comparing the versions in which map update data appears can prevent generation of dependency on new update data.

The above processing is performed as preprocessing, and the resultant map update data and per-area update data management table are stored in the map update data memory 101 and the update management data memory, respectively.

Now, 810 or later steps in FIG. 8 are described. When the navigation device 20 starts to update the map data on receipt of an instruction from the user or the like, a map update request 806 is sent to the map distribution center 10. FIG. 19 shows an exemplary data structure of the map update request. This map update request contains the ID of an area to update, a base version, which is the initial data version of the navigation device 20, and an updated area version, which is the version of an area updated in the past. It is possible to send a current latest version for each area without modification, in order to reduce the load on the map distribution center 10.

Figure 20:
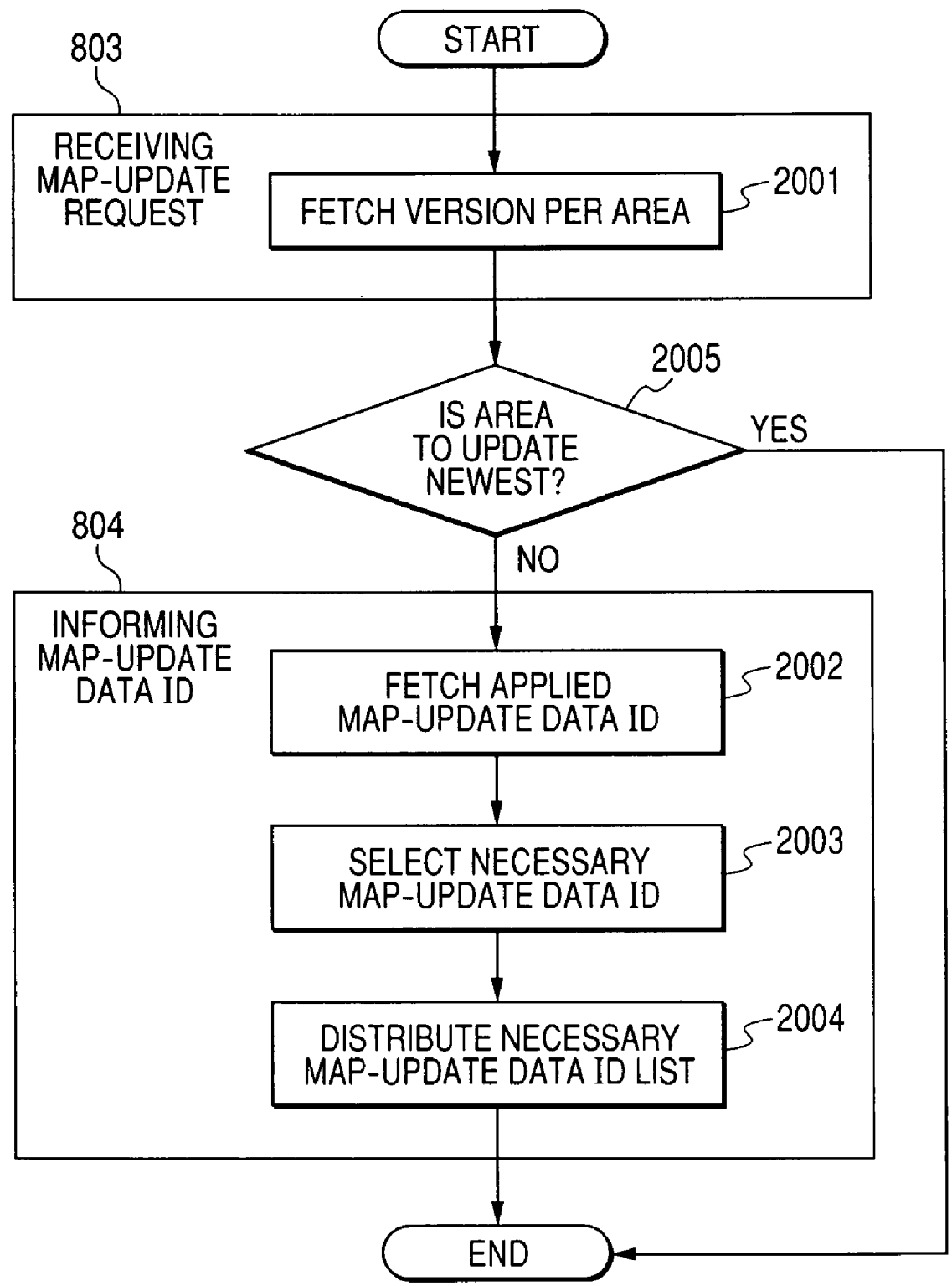
FIG. 20 is an exemplary processing to be performed by the map distribution server on receipt of a map update request.

On receipt of the map updated request 806, the map distribution server 10 produces a list of IDs of map update data required by the navigation device 20 and sends it back. FIG. 20 shows this procedure. First, at step 2001 (fetch per-area version), fetch the per-area version and the area to update ID contained in area units in the map update request 806. This data is compared with the map data held by the map distribution center 10 to determine whether or not the area to update of the data held by the navigation device 20 is the latest data. This comparison corresponds to step 2005 in FIG. 20, and if the data held by the navigation device 20 is the latest data this processing will end. If the data held by the navigation device 20 is not the latest, then step 2002 (fetch applied map update data ID) starts. This is a processing for the navigation device 20 to fetch a list of already applied map update data IDs. Using each area fetched at step 2001 and its version, the area ID 1401 and version 1402 columns of the per-area map update data management table in FIG. 14 is searched to fetch the required map update data ID list 1403. A set of all areas is the map update data already applied by the navigation device 20 (instead of a set of all areas, a set of areas around the area to update is sufficient). Next, step 2003 (select required map update data ID) is performed. This is a processing to fetch the required map update data ID list to make the area to update latest. Using the area to update ID and the latest version, the area ID 1401 and version 1402 columns of the per-area map update data management table are searched to fetch the required map update data ID list 1403. The data also existing in the applied map update data ID list are removed from this map update data list. This prevents duplicate fetch of already fetched map update data. Finally at step 1050, this list is sent back as a map update data ID list 807.

Figure 21:
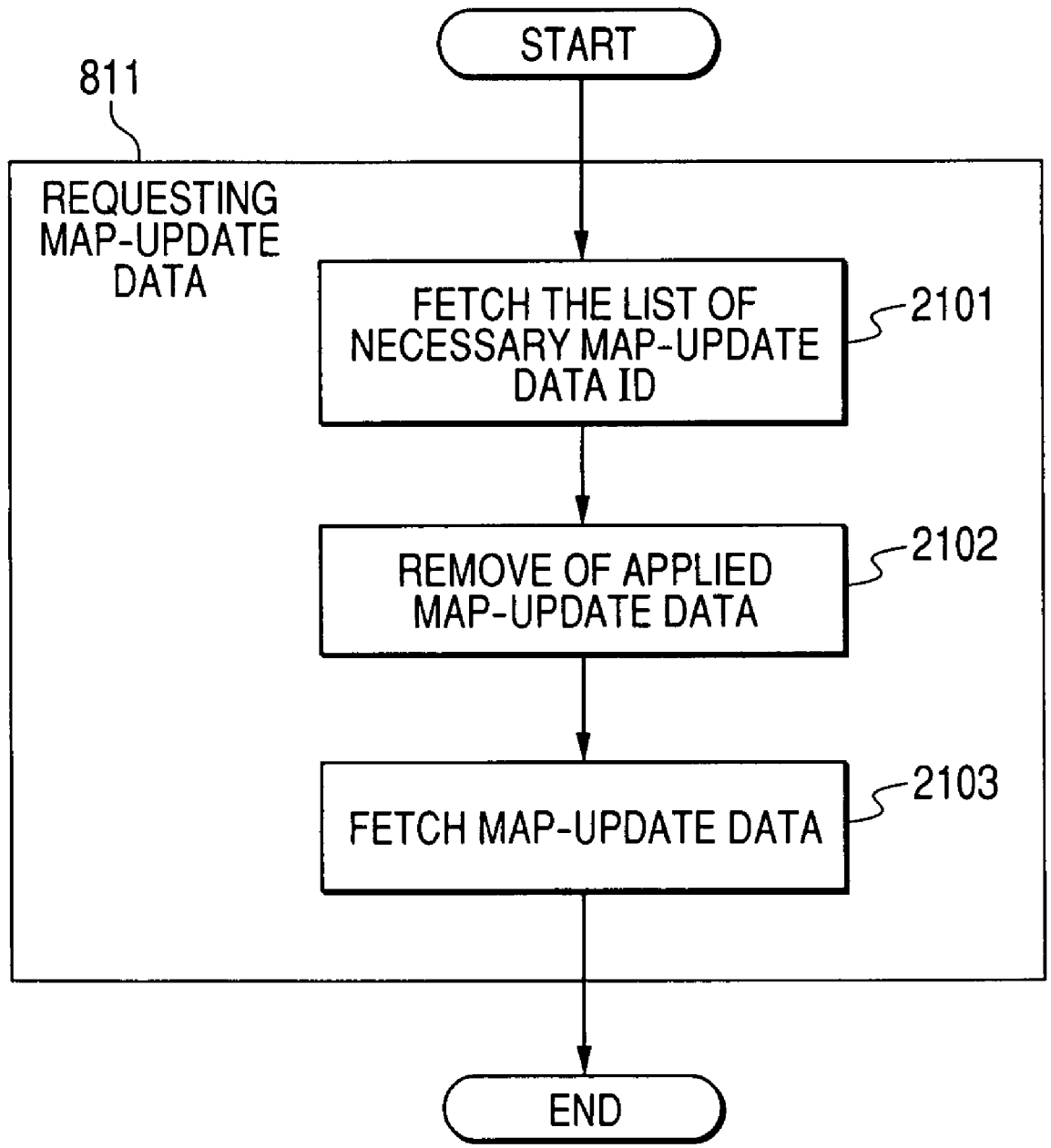
FIG. 21 is an example of map update requesting.

The navigation device 20, on receipt of the map update data ID list 807, fetches each map update data described in the list. This processing is the map update data requesting 811. FIG. 21 shows this procedure. First, at step 2101 (fetch required map update data ID list), the map update data ID list distributed by the map distribution server 10 is fetched. At step 2102 (remove applied map update data ID), the already fetched IDs is removed from the map update data ID list. Finally at step 2103 (fetch map update data), a map update data request is sent to the map distribution center 10. On receipt of this map update data request, the map distribution center 10 refers to the map update data memory and sends back each map update data. The navigation device 20 can uses the received map update data to update the map data for the area to update.

According to the embodiments described above, the navigation device 20 can update a map in area units with the roads being connected. However, the present invention is not limited to the above embodiment, and various modifications are possible within the spirit and scope of the present invention. For example, in the above embodiments, it is possible to navigate with data fit for a new map by maintaining a table that shows the correspondence between the link ID and node ID in the map data memory and such data as road name and traffic regulation, and updating this table according to updated map data. Also, the above embodiments are described using the update of links constituting a road as examples, the present invention is not restricted to these embodiments. For example, if there is map update data for map elements represented by a network, such update data can be distributed. Furthermore, in the above embodiments, it is possible to update the map data memory 206 by, for example, connecting to the network 40 a device without the navigation processor 207 of the navigation device 20 and with the detachable map data memory 206. It is also possible to detach the map data memory 206 from the device and attach the same to a navigation device separately provided.

Figure 22:
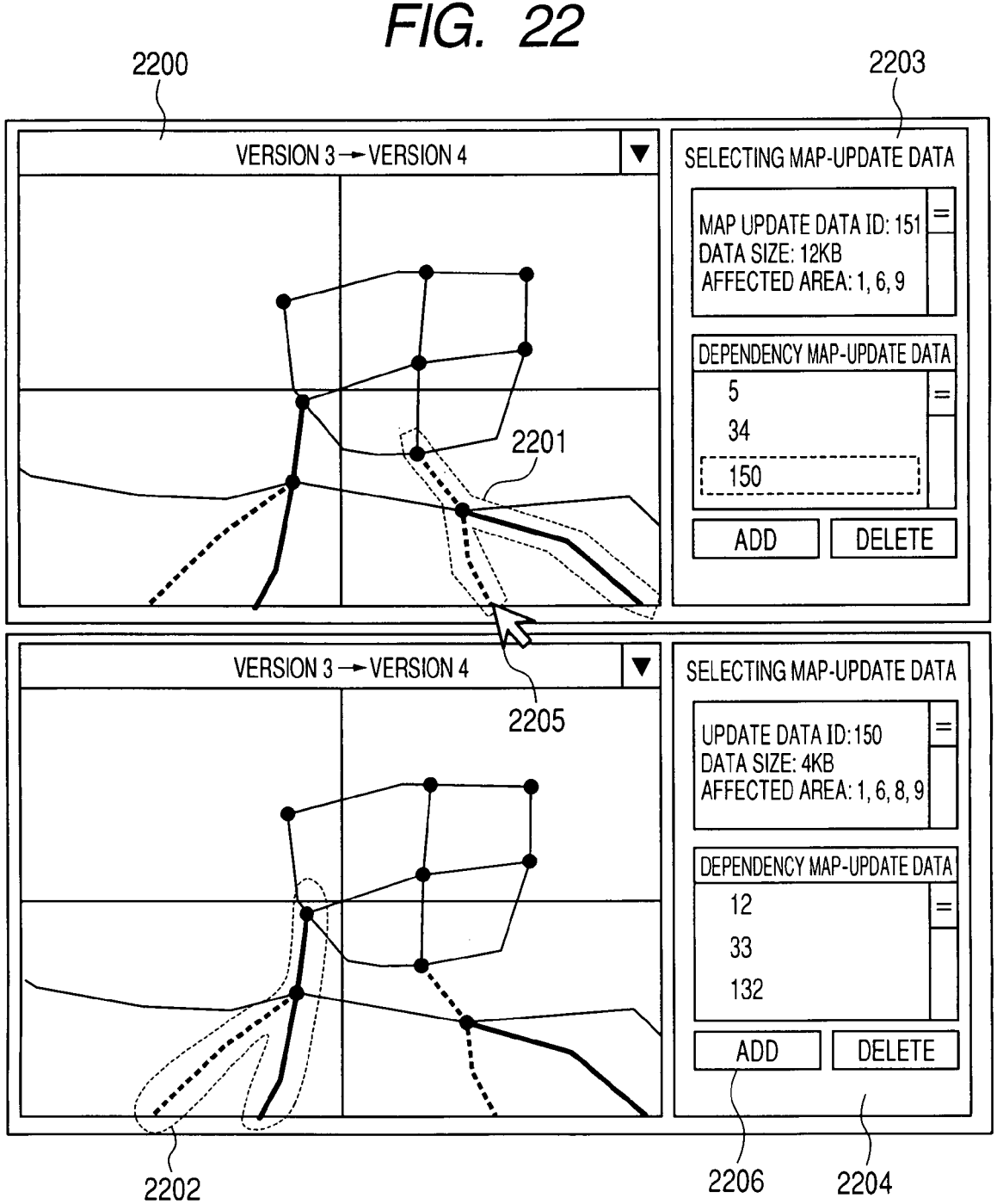
FIG. 22 is an exemplary operation screen for editing the map update data management table.
Figure 23:
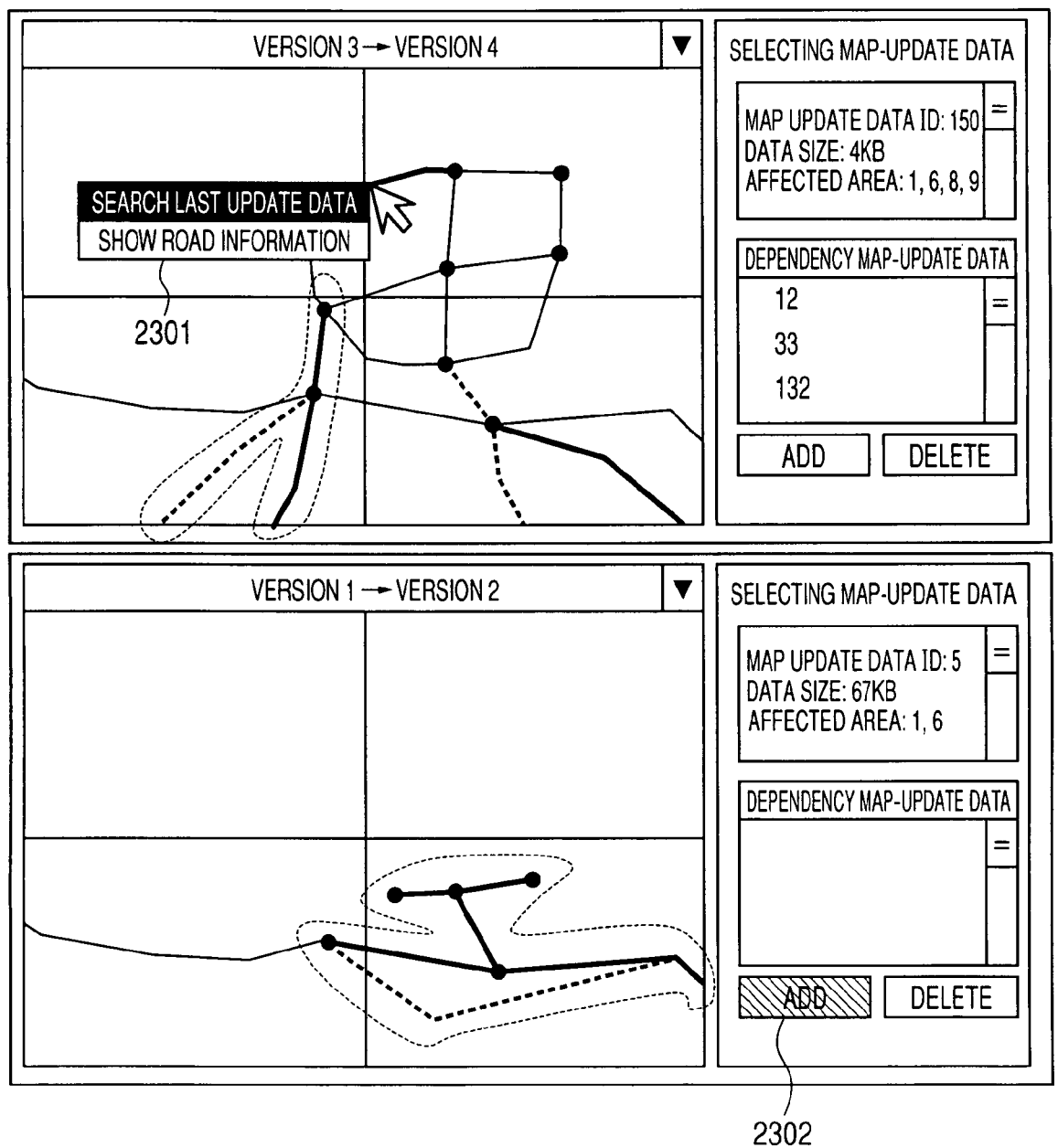
FIG. 23 is an exemplary screen on which to execute a function of detecting the map update data in which the selected road was last updated.

Furthermore, the map distribution server 10 may have a function of editing the update data management table and/or the per-area map updated data management table through the operation by an operator. FIG. 22 shows an exemplary display of the screen. This is an example of making it easy to edit the dependency between two map update data by allowing two map update data to be selected simultaneously. In this example, map update data is displayed on the left side of the screen and the detail of the selected map update data is displayed on the right. Since the difference between two versions of maps is necessary when displaying the map update data, two versions of maps displayed on the left side of the screen are overlapped so that altered roads can be identified. On this left side map, when a road is selected with a mouse pointer 2205, the map update data including the update of that road is surrounded with a dotted line 2201 to indicate that it is selected. The detailed information on the selected map update data is displayed on the update data detailed information display screen 2203 on the right. This left and right combination is displayed the upper and lower parts of the screen, and the detailed information of the map update data 2201 selected on the upper part is displayed at 2203 and that of the map update data 2202 is displayed at 2204. In this state, if, for example, a dependency add button 2205 is pressed, 2201 is added to the dependency map update data of the map update data 2203.

As shown in this example, by two map update data simultaneously selectable, the dependency between them can be easily edited. Also, this method allows the dependency across plural versions to be easily edited, as shown in FIG. 22. In this case, it is possible to avoid a situation where new version of map update data is required to apply old version map update data, by disabling the dependency add button 2302 to prevent erroneous editing of the dependency. It is also possible to display a menu 2301 to call up a function of searching last update data. When the function of searching last update data from this menu is called up, the map distribution server 10 searches the last updated table in FIG. 13, retrieves the map update data that updated the road last, and display the same. This allows the editing operation to be more efficient.

After the dependency between map update data was edited by the above operation, finally the per-area update data management table 904 is executed to update the per-area map update data management table. This makes it possible to establish a dependency that was hard to determine in such a case as when regulations on the other roads were lifted because a new expressway was opened.

Figure 24:
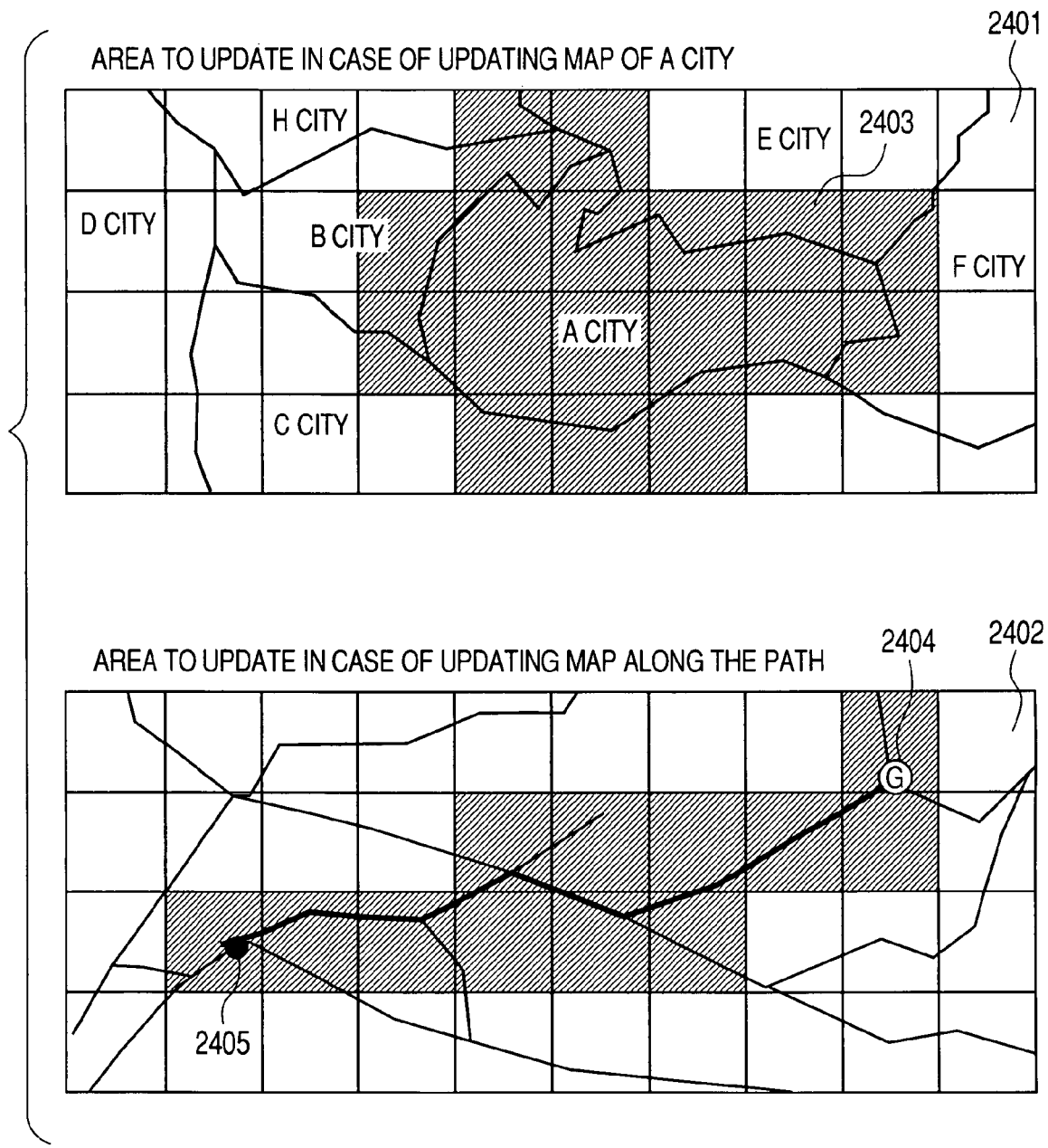
FIG. 24 is an exemplary function of updating the map data for a given region by combining plural areas.

It is also possible to update the map according to various requirements, such as per city, town, village, or along a path, as shown in FIG. 24. 2401 is an example of update per city/town/village. Updating per city/town/village can be realized by combining areas so that the whole city/town/village is covered, as in the shaded area 2403 in the figure. 2402 shows an example of updating the area along a path. This is an example of searching a path from current position 2405 to destination 2404 and updating the shaded area contacting that path. As shown in these examples, if an area is fragmented, it is possible to update the map data in units of areas close to the area the user wants to update.

What is claimed is:

1. A map distribution system including a map distribution server that distributes map data and a navigation device that receives said map data, said map distribution server comprising:
    a map update data management table having a plurality of first entries, each first entry including a respective set of map update data in correspondence with a map update data ID for the respective set of map update data and a map update data ID for each other set of map update data upon which the respective set of map update data included in the first entry depends;
    a memory that stores a per-area map update data management table having a plurality of second entries, each second entry including an area identification of an area of said map data in correspondence with a version of the area and the map update data ID for each set of said map update data that has necessarily been applied for the area identified by the area identification of the second entry in the version of the second entry;
    a map update data manager that refers to said per-area map update data management table to select the map update data ID for each set of map update data required for updating an area selected based on an input from said navigation device and the required map update data ID for each other set of map update data upon which any set of map update data required for updating the area selected depends; and
    a communication device that distributes each set of map update data corresponding to each selected map update data ID.

2. The map distribution system according to claim 1, said map update data manager of said map distribution server comprising:
    a function of dividing a network, from which road data that is map update data to update, into connected components;
    a function of detecting map update data that disconnects or connects said connected components;
    a function of making road data between said connected components and dependency attribute of plural or single connection map update data to connect correspond to each other from disconnection map update data that disconnects said connected components, and storing in said memory said connection map update data as dependent map update data that is necessary to apply for applying said disconnection map update data; and
    a function of distributing, when selected map update data includes disconnection map update data, corresponding said dependent map update data as well.

3. The map distribution system according to claim 2, said map update data manager of said map distribution server comprising:
    a function of displaying two sets of map update data on a single display screen; and a function of making, when an input is received to select said displayed two sets of map update data, either of said two sets of map update data dependent on the other set of map update data.

4. The map distribution system according to claim 3, said map distribution server comprising:
   a function of accepting a road selection; and
   a function of retrieving a most recent set of map update data that updated said road from the map update data management table.

5. The map distribution system according to claim 2, wherein said map update data manager of said map distribution server, as means for distributing connection map update data that adds a road to connect said connected components when distributing disconnection map update data that disconnects said connected components, adds to the map update data management table, the connection map update data that adds road data to connect said connected components.

6. The map distribution system according to claim 1, wherein said navigation device sends to said map distribution server, a map update request specifying a version number per area of said map data held by said navigation device; and
   wherein said map update data manager of said map distribution server decides an area to update, based on said version number per area of said map data.

7. A map distribution management method for a map distribution system including a map distribution server that distributes map data; and a navigation device that receives said map data,
   said map distribution server having:
      a memory that stores a map update data management table having a plurality of first entries, each first entry including a respective set of map update data in correspondence with a map update data ID for the respective set of map update data and a map update data ID for each other set of map update data upon which the respective set of map update data included in the first entry depends
      a per-area map update data management table having a plurality of second entries, each second entry including an area identification of an area of said map data in correspondence with a version of the area and the map update data ID for each set of said map update data that has necessarily been applied for the area identified by the area identification of the second entry in the version of the second entry;
      a map update data manager; and
      a communication device,
   said map distribution management method comprising:
   in the map update data manager,
      a first step to refer to said per-area map update data management table to select the map update data ID for each set of map update data required for updating an area selected based on an input from said navigation device and the required map update data ID for each other set of map update data upon which any set of map update data required for updating the area selected depends; and
      a second step to distribute from said communication device each set of map update data corresponding to each selected map update data ID.

8. The map distribution management method according to claim 7, further comprising:
   in said map update data manager of said map distribution server,
      a third step to divide a network, from which road data that is map update data to update is removed, into connected components;
      a fourth step to detect map update data that disconnects or connects said connected components; and
      a fifth step to make road data between said disconnected connected components correspond to dependency attribute of plural or single connection map update data, and store said connection map update data in said memory, as dependent map update data that is necessary to apply for applying said disconnection map update data
   wherein, if the set of map update data corresponding to said map update data ID at said second step includes disconnection map update data, said corresponding dependent map update data is also distributed.

9. The map distribution management method according to claim 8, further comprising:
   in said map update data manager of said map distribution server,
      a sixth step to display two sets of map update data on a single display screen; and
      a seventh step to, when an input to select said displayed two sets of map update data is received, store said selected sets of map update data by making either one dependent on the other.

10. The map distribution management method according to claim 9, comprising:
    in said map distribution server,
       an eighth step to accept a road selection; and
       a ninth step to retrieve a most recent set of map update data that updated said road from said map update data management table.

11. The map distribution management method according to claim 8, further comprising:
    in said map update data manager, as means for distributing connection map update data that adds a road connecting said connected components when distributing disconnection map update data that disconnects said connected components, a tenth step to add the connection map update data that adds road data connecting said connected components.

12. The map distribution management method according to claim 7, further comprising:
    in said map distribution server,
       an eleventh step to receive a map update request specifying a version number per area of said map data from said navigation device,
    wherein, at said first step, said map update data manager of said map distribution server decides an area to update based on said version number per area of said map data.

13. A map distribution server that is connectable to a navigation device and that distributes map data, comprising:
    a map update data management table having a plurality of first entries, each first entry including a respective set of map update data in correspondence with a map update data ID for the respective set of map update data and a map update data ID for each other set of map update data upon which the respective set of map update data included in the first entry depends;
    a memory that stores a per-area map update data management table having a plurality of second entries, each second entry including an area identification of an area of said map data in correspondence with the version of the area and the map update data ID for each set of said map update data that has necessarily been applied for the area identified by the area identification of the second entry in the version of the second entry;

a map update data manager that refers to said per-area map update data management table to select the map update data ID for each set of map update data required for updating an area selected based on an input from said navigation device and the required map update data ID for each other set of map update data upon which any set of map update data required for updating the area selected depends; and a map update data distributor that distributes each set of map update data corresponding to each selected map update data ID.

14. The map distribution server according to claim 13, said map update data manager having:

a function of dividing a network from which road data that is map update data to update into connected components;

a function of detecting map update data that disconnects or connects said connected components;

a function of making road data between said disconnected connected components correspond to dependency attribute of plural or single connection map update data, and store said connection map update data in said memory, as dependent map update data that is necessary to apply for applying said disconnection map update data; and a function of, if the set of map update data corresponding to said map update data ID at said second step includes disconnection map update data, said corresponding dependent map update data is also distributed.

15. The map distribution server according to claim 14, said map update data manager having:

a function of displaying two sets of map update data on a single display screen; and a function of making, when an input is received to select said displayed two sets of map update data, either of said two sets of map update data dependent on the other set of map update data.

16. The map distribution server according to claim 15, said map update data manager having:

a function of accepting a road selection; and a function of retrieving a most recent set of map update data that updated said selected road from said map update data management table.

17. The map distribution server according to claim 14, wherein said map update data manager, as means for distributing connection map update data that adds a road to connect said connected components when distributing disconnection map update data that disconnects said connected components, adds to the map update data management table, the connection map update data that adds road data to connect said connected components.

18. The map distribution server according to claim 13, wherein said map update data manager receives a map update request specifying a version number per area of said map data held by said navigation device, from said navigation device, and decides an area to update based on said version number per area of said map data.

* * * * *